Nov. 3, 1964        R. A. BALES        3,155,414
HANDLE
Filed Sept. 24, 1962
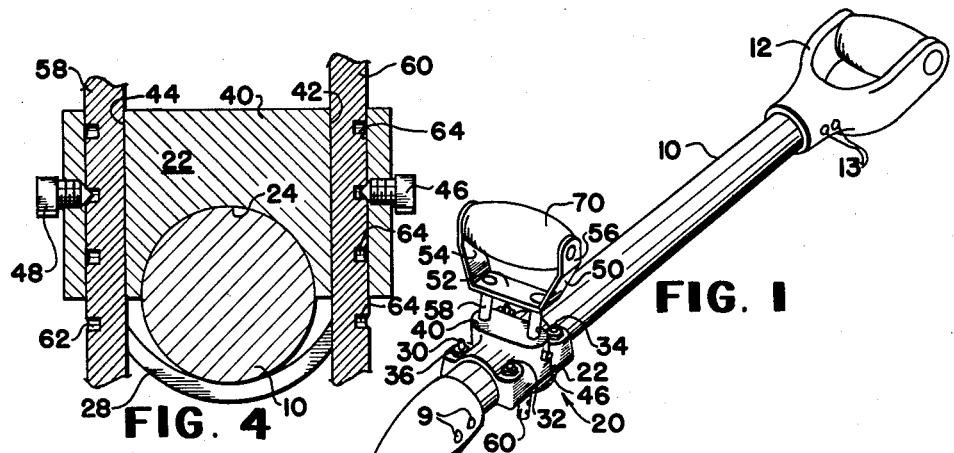
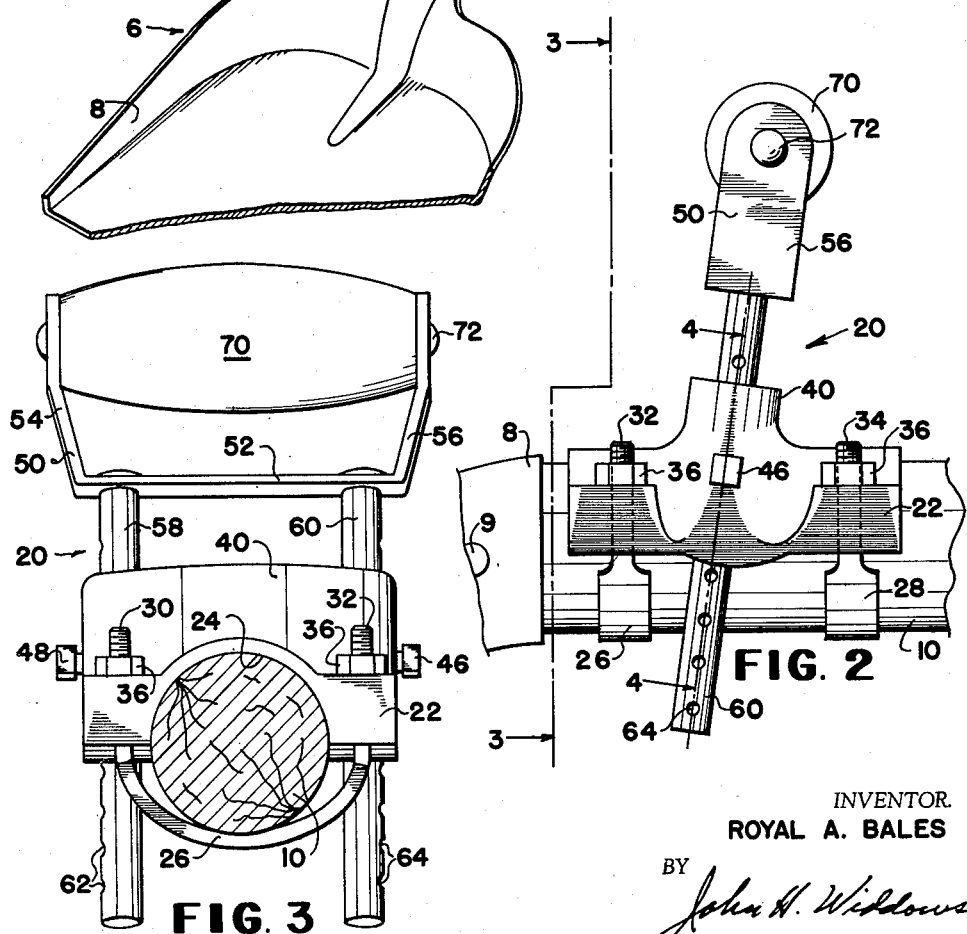
INVENTOR.
ROYAL A. BALES
BY John H. Widdowson
ATTORNEY

United States Patent Office 3,155,414
Patented Nov. 3, 1964

3,155,414
HANDLE
Royal A. Bales, Kensington, Kans.
Filed Sept. 24, 1962, Ser. No. 225,623
3 Claims. (Cl. 294—58)

This invention relates to handle means. In a more specific aspect, the invention relates to auxiliary handle means which are mountable on a shovel, scoop, tools, implements or the like to be gripped by the user. In another aspect, the invention relates to new auxiliary handle means for mounting on the shank portion of a shovel, scoop or the like wherein the mounting can be accomplished without modification of or damage to the tool on which it is to be mounted and wherein the handle means is adjustable longitudinally along the tool or the like on which it is mounted and wherein the hand gripping portion thereof is adjustable outwardly relatively to the tool or the like on which it is mounted.

Various types of handle means are known to the art, including auxiliary handle means for shovels, scoops and other types of tools. The auxiliary handle means of the prior art normally require the handle means to be fixedly connected to the shovel or the like in a permanent manner and in some instances require modification of the member on which the auxiliary handle is mounted. Furthermore, the auxiliary handle means of the prior art do not provide for desirable adjustments of the handle relative to the tool on which it is mounted so that the handle can be comfortably positioned for substantially any individual using the tool or the like on which it is mounted.

In accordance with the present invention, the deficiencies of the prior art have been overcome. The handle means of the invention includes a body and means adjustable connected to the body to mount the body in place. Hand hold means are operatively connected to the body and the hand hold means are adjustable relative to the body to vary the spacing between the hand hold means and the body. The handle means is constructed and adapted to be mounted on a scoop, shovel or the like with the body being adjustably positionable on the scoop, shovel or the like and with the hand hold means being adjustable relative to the body to thereby position the hand hold means in the desired location during use.

Accordingly, it is an object of the invention to provide new handle means.

Another object of the invention is to provide new handle means which are constructed and adapted for mounting on the shank portion of a handle of a shovel, scoop or the like.

A further object of the invention is to provide new auxiliary handle means for a shovel, scoop or the like wherein the auxiliary handle means is longitudinally adjustable along the handle of the shovel, scoop or the like and wherein the hand hold portion thereof is adjustable outwardly relative to the shank portion of the shovel or the like.

Another object of the invention is to provide new auxiliary handle means for tools or the like which can be mounted on the tool or the like without modification of the tool or without damage thereto and wherein the auxiliary handle is adjustable to the individual user.

Various other objects, advantages and features of the invention will become apparent to those skilled in the art from the following description taken in conjunction with the accompanying drawings, in which:

FIG. 1 is a partial isometric view showing a scoop or the like having a preferred specific embodiment of the auxiliary handle means of the invention mounted thereon.

FIG. 2 is an enlarged side elevation view of the embodiments of the auxiliary handle means of the invention of FIG. 1 showing same mounted on the scoop or the like.

FIG. 3 is a cross section view taken along the line 3—3 of FIG. 2.

FIG. 4 is a partial cross section view taken on the line 4—4 of FIG. 2.

The following is a discussion and description of a preferred specific embodiment of the new handle of the invention, such being made with reference to the drawings whereon the same reference numerals are used to indicate the same or similar parts and/or structure. It is to be understood by those skilled in the art that this description is intended to illustrate and not to limit the scope of the invention.

Referring now to the drawings in detail, FIG. 1 of the drawings illustrates a scoop or the like shown generally at 6 which includes the usual blade portion 8 which is fixedly attached by pins or other fastening means 9 to a shank portion 10 of a handle or the like and the handle can be provided with hand gripping means 12 of any suitable construction which are fixedly connected by pins 13 to the shank portion 10 at the end thereof opposite from the blade 8. The scoop 6 illustrated in the drawings is merely illustrative of a suitable tool in which the auxiliary handle means of the invention can be used and it is to be understood that the handle means can be mounted on shovels, scoops, implements, tools or the like.

A preferred specific embodiment of the adjustable auxiliary handle of the invention is shown generally at 20 and includes an elongated body 22 having a substantially semi-cylindrical recess 24 therein in one surface thereof which extends longitudinally along the entire length of the body 22 and is adapted to receive a portion of the shank portion 10 of the shovel, scoop or the like 6 as illustrated in the drawings.

Means are provided with the body 22 to mount the body in the desired place on the shank portion of the scoop or the like. Preferably two U-shaped clamp members 26 and 28 of like construction are provided and each have threaded end portions as shown at 30 and 32 for the clamp 26 in FIGS. 1 and 3 and as shown at 34 for the clamp 28 in FIGS. 1 and 2. These threaded end portions of the clamps 26 and 28 project through the body 22 and are desirably positioned at opposite end portions of the body. The intermediate portions of the clamps 26 and 28 are preferably flat and engage the shank portion 10 of the handle of the shovel, scoop or the like 6 to thereby removably attach the body 22 to the scoop or the like. A plurality of nuts 36 are removably mounted on the threaded end portions 30, 32 and 34 of the clamps to adjustably connect same to the body 22 and tightly hold the handle 20 in the desired longitudinal position on the scoop or the like.

The body 22 of the auxiliary handle 20 desirably has an enlarged generally oblong portion 40 which projects upwardly from the main portion of the body 22 and extends transversely thereacross at substantially the longitudinal center of the body. Two spaced and substantially parallel holes 42 and 44 are preferably provided in the body 22 of the auxiliary handle 20 and desirably pass through the enlarged oblong portion 40 thereof and are preferably positioned in substantially the longitudinal center portion of the body and pass on opposite sides of the recess 24 in the body. Preferably the axis of the holes 42 and 44 are at an angle slightly less than a right angle to the axis of the recess 24 to thereby mount the hand hold means at a slight angle relative to the body as set forth hereinafter.

Two set screws 46 and 48 are provided and are threadedly mounted in the body 22 of the handle 20 and preferably are located in the end portions of the oblong portion 40 of the body. The set screws are positioned so that they can be adjusted inwardly into the holes 42 and 44.

A substantially U-shaped handle frame 50 is preferably provided which has a substantially flat center portion 52 and projecting end portions 54 and 56. Two elongated rods 58 and 60 are provided and each are fixedly mounted in one end portion on the center portion 52 of the handle frame 50 and project therefrom in substantially parallel relation in a direction opposite from the end portions 54 and 56 of the frame 50. The rods 58 and 60 desirably have a plurality of substantially longitudinally aligned openings 62 and 64, respectively, which face outwardly relative to each other and which are in spaced relation.

The rods 58 and 60 are spaced apart a distance substantially equal to that of the spacing of the holes 42 and 44 in the body 22 of the auxiliary handle 20 and are slidably positioned in the holes 42 and 44. The rods 58 and 60 are adjustably positioned in the holes 42 and 44 and to locate same at the desired position they are removably mounted on the body 22 by use of the set screws 46 and 48 which are tightened to move same into engagement with the rods. Preferably the end portions of the set screws 46 and 48 are substantially pointed as illustrated in FIG. 4 and are positioned in the holes or openings 62 and 64 in the rods to thereby removably mount the rods in the body.

A hand hold member 70 is provided and is rotatably mounted between the end portions 54 and 56 of the handle frame 50 in any suitable manner, such as by the use of a pivot or shaft 72 which extends through the hand hold member 70 and is fastened to the end portions of the frame 50. Preferably at least the outer portion of the hand hold member 70 is made of a suitable resilient material, such as a rubber or rubber-like material, suitable plastics, etc., and the hand hold means is thereby more comfortable to the user.

The auxiliary handle is constructed and adapted to be removably mounted on the shank portion 10 of the scoop or the like 6 as illustrated in the drawings and is adjustable longitudinally along the shank portion 10 of the scoop by loosening the nuts or the like 36 and moving the body portion 22 of the handle 20 to the desired location and retightening the nuts. Substantially radial adjustment of the hand hold portion 70 is achieved by loosening the set screws 46 and 48 and moving the hand hold means 70 inwardly or outwardly relatively to the holes or openings 42 and 44 in the body and subsequently retightening the set screws.

As will be apparent from FIG. 2 of the drawings the rods 58 and 60 are inclined at an angle slightly less than a right angle to the axis of the recess 24 and to the rear portion of the shank portion 10 of the scoop or the like when the auxiliary handle 20 is mounted thereon. This slight inclination of the rods is preferable in that it more accurately positions the hand hold portion 70 of the handle in the desired position or relation relative to the shank portion 10 of the scoop or the like to be comfortably gripped by the user and the force directed by the user in lifting the scoop or the like is more accurately in line with the load to be lifted.

In use, the scoop or the like 6 is gripped by the user by placing one hand on the handle or the like 12 and the other hand on the hand hold portion 70 of the auxiliary handle 20 and in this manner the blade portion 8 of the scoop can be accurately and effectively maneuvered in scooping operations. The axis of the hand hold portion 70 is substantially perpendicular to the axis of the shank portion 10 of the handle and is therefore more comfortable to the user, that is, his hand is in a more nearly normal or natural position than when he must surround or grip the shank portion 10 of the scoop or the like.

While the invention has been described in connection with a preferred specific embodiment thereof, it will be understood by those skilled in the art that such is intended to illustrate and not to limit the scope of the invention which is defined by the claims.

I claim:
1. An adjustable auxiliary handle for a shovel, scoop or the like comprising, in combination, an elongated body having a substantially semi-cylindrical recess therein in one surface thereof extending longitudinally of the body and adapted to receive a portion of the shank portion of a handle of a shovel, scoop or the like, two U-shaped clamp members each having threaded end portions projecting through said body at opposite end portions of said body with the intermediate portions of said clamps engageable with the shank portion of a handle or a shovel, scoop or the like when positioned in said recess in said body to removably attach said body to said shovel, scoop or the like, a plurality of nuts removably mounted on said end portions of said clamps to connect same to said body, said body having two spaced and substantially parallel holes therethrough in the longitudinally center portion thereof positioned on opposite sides of said recess in said body and at an angle less than a right angle to the axis of said recess, two set screws adjustably mounted in said body with the shank portions thereof positionable in said holes, a substantially U-shaped handle frame having a flat center portion and projecting end portions, two elongated rods each fixedly mounted in one end portion on said center portion of said handle frame and projecting therefrom in substantially parallel relation in a direction opposite from said end portions of said frame, each of said rods having a plurality of aligned openings therein in spaced relation, said rods being positioned apart a distance equal to the spacing of said holes in said body and being adjustably positioned in said holes with said set screws positionable in said openings in said rods to removably mount said rods in said body, and a resilient generally cylindrical hand hold member rotatably mounted between said end portions of said handle frame, said auxiliary handle being constructed and adapted to be removably mounted on the shank portion of the handle of a shovel, scoop or the like with said auxiliary handle being adjustable longitudinally and radially from said shank portion of said handle of a shovel, scoop or the like with said hand hold member being engageable by one hand of the user during use.

2. An adjustable auxiliary handle for a shovel, scoop or the like comprising, in combination, an elongated body having an elongated arcuate recess therein on one surface thereof adapted to receive a portion of the shank portion of a handle of a shovel, scoop or the like, clamp means removably connected to said body to adjustably mount same on the shank portion of a handle of a shovel, scoop or the like, said body having two spaced holes therethrough positioned on opposite sides of said recess in said body and at an angle less than a right angle to the axis of said recess, set screws adjustably mounted in said body with the end portions thereof being positionable in said holes, a frame, two rods connected in one end portion to said frame, said rods being positioned in said holes in said body and engaged by said set screws to removably mount said rods therein, hand hold means connected to said frame with the axis of said hand hold means being substantially perpendicular to and in spaced relation to the axis of said recess in said body, said auxiliary handle being constructed and adapted to be removably mounted on the shank portion of a handle of a scoop, shovel or the like with said auxiliary handle being adjustable longitudinally along said shank portion and with said hand hold means of said auxiliary handle being adjustable relative to said shank portion of said handle of said scoop, shovel or the like in use.

3. An adjustable auxiliary handle for a shovel, scoop, or the like, comprising, in combination, a body having a recess on one surface thereof adapted to engage a portion of the shank portion of the handle of a shovel, scoop or the like, clamp means removably connected to said body to adjustably mount same on the shank portion of the handle of a shovel, scoop or the like, said body having spaced holes therethrough extending generally transverse to the axis of said recess, a frame having rods positioned in said holes in said body, and hand hold means extending transverse to the axis of said recess of said body and spaced therefrom, locking means on said body for rigidly securing said rods of said frame in said holes relative to said body, said auxiliary handle being constructed and adapted to be removably mounted on the shank portion of a handle of a scoop, shovel or the like with the auxiliary handle being adjustable longitudinally along the shank portion and with said hand hold means of said auxiliary handle being adjustable relative to said shank portion of said handle of said scoop, shovel or the like in use.

References Cited in the file of this patent
UNITED STATES PATENTS

| | | |
|---|---|---|
| 842,912 | Rundell | Feb. 5, 1907 |
| 911,291 | Byor | Feb. 2, 1909 |
| 933,647 | Hunt | Sept. 7, 1909 |